(12) United States Patent
Massicot et al.

(10) Patent No.: US 10,112,431 B2
(45) Date of Patent: Oct. 30, 2018

(54) METHODS, DEVICES AND IDENTIFICATION DOCUMENT FOR A PERSON OR AN ANIMAL

(71) Applicant: ADVANCED TRACK & TRACE, Rueil-Malmaison (FR)

(72) Inventors: Jean-Pierre Massicot, Rueil-Malmaison (FR); Alain Foucou, Rueil-Malmaison (FR); Zbigniew Sagan, Rueil-Malmaison (FR)

(73) Assignee: ADVANCED TRACK & TRACE, Rueil-Malmaison (FR)

( * ) Notice: Subject to any disclaimer, the term of this patent is extended or adjusted under 35 U.S.C. 154(b) by 394 days.

(21) Appl. No.: 14/436,460

(22) PCT Filed: Oct. 16, 2013

(86) PCT No.: PCT/FR2013/052473
§ 371 (c)(1),
(2) Date: Apr. 16, 2015

(87) PCT Pub. No.: WO2014/060700
PCT Pub. Date: Apr. 24, 2014

(65) Prior Publication Data
US 2015/0266331 A1     Sep. 24, 2015

(30) Foreign Application Priority Data

Oct. 16, 2012 (FR) .................................... 12 59876

(51) Int. Cl.
*B42D 25/313* (2014.01)
*G07C 9/00* (2006.01)
(Continued)

(52) U.S. Cl.
CPC ......... *B42D 25/313* (2014.10); *B42D 25/485* (2014.10); *G06F 3/1238* (2013.01);
(Continued)

(58) Field of Classification Search
CPC .. B42D 25/313; B42D 25/305; B42D 25/485; B42D 25/405; B42D 25/333;
(Continued)

(56) References Cited

U.S. PATENT DOCUMENTS

| 5,974,150 A | 10/1999 | Kaish et al. |
| 2005/0077351 A1 | 4/2005 | De Jong |

(Continued)

FOREIGN PATENT DOCUMENTS

| CA | 2384675 A1 * | 3/2001 | ......... G07C 9/00079 |
| FR | 2 776 153 A1 | 9/1999 | |

(Continued)

*Primary Examiner* — Justin V Lewis
(74) *Attorney, Agent, or Firm* — PatShegen IP; Eva Taksel (57) ABSTRACT

A device for producing a document carrying the identification of a person/animal. A first detector to determine the printing conditions of the document. A sensor to obtain the biometric data of the person/animal. A first encoder encodes the biometric data to form a digital identification image including redundancies. A second detector to determine physical characteristics of cells of at least one shape, such that the proportion of cells printed with a print error results from unanticipated unknowns in printing. A second encoder to form, within the shape, an authentication image for authenticating the document and includes elementary cells representing the encoded authentication image. A printer to print the authentication and identification images on the document, and to generate random errors in the printed elementary cells of the authentication image to detect modification to the appearance of the elementary cells.

11 Claims, 5 Drawing Sheets

(51) Int. Cl.
   *B42D 25/485* (2014.01)
   *G06F 3/12* (2006.01)
   *G06K 9/00* (2006.01)
   *G06K 15/00* (2006.01)
   *H04N 1/32* (2006.01)
   *B42D 25/333* (2014.01)

(52) U.S. Cl.
   CPC ..... *G06K 9/00087* (2013.01); *G06K 15/4095* (2013.01); *G07C 9/00087* (2013.01); *H04N 1/32144* (2013.01); *B42D 25/333* (2014.10); *B42D 2035/06* (2013.01); *G07C 2209/41* (2013.01)

(58) Field of Classification Search
   CPC ........... B42D 2035/06; G06K 9/00087; G06K 15/4095; G06F 3/1238; H04N 1/32144; G07C 9/00087; G07C 2209/41
   USPC ........ 283/67, 68, 69, 70, 72, 74, 75, 77, 78, 283/901
   See application file for complete search history.

(56) References Cited

U.S. PATENT DOCUMENTS

| | | | |
|---|---|---|---|
| 2005/0196013 A1* | 9/2005 | Rhoads | G06F 17/30876 382/100 |
| 2006/0165256 A1 | 7/2006 | Carr et al. | |
| 2014/0112525 A1* | 4/2014 | Picard | G03G 21/046 382/100 |

FOREIGN PATENT DOCUMENTS

| | | |
|---|---|---|
| FR | 2 831 976 A1 | 5/2003 |
| WO | 2009/004172 A2 | 1/2009 |
| WO | WO-2009004172 A2 * | 1/2009 ........... G03G 21/046 |

* cited by examiner

METHODS, DEVICES AND IDENTIFICATION DOCUMENT FOR A PERSON OR AN ANIMAL

RELATED APPLICATION

This application is a § 371 application from PCT/FR2013/052473 filed Oct. 16, 2013, which claims priority from French Patent Application No. 1259876 filed Oct. 16, 2012, each of which is herein incorporated by reference in its entirety.

TECHNICAL FIELD OF INVENTION

This invention envisages a method, a devices and an identification document for a person or an animal. It applies in particular to the manufacturing of identification documents and to the verification of the authenticity and integrity of the identification documents.

BACKGROUND OF THE INVENTION

Many types of identification documents are known. However, even though they are difficult to forge, techniques exist to alter the biometric information they bear, irrespective of whether it is a photograph, a fingerprint, the size, hair or eye color of their bearer.

In addition, these elements are difficult to verify as, once altered, they may match a new bearer of the identification document.

OBJECT AND SUMMARY OF THE INVENTION

The present invention aims to remedy these drawbacks.

To this end, according to a first aspect, the present invention envisages a device for producing a document carrying the identification of person or animal.

Thanks to these provisions, the biometric data of the document's bearer are encoded and therefore particularly difficult to forge. In addition, the printed authentication image has, as soon as it is first printed on the document, a large quantity of random errors that cause a copy, made with the same printing means as the original, of the printed identification image to comprise even more errors, the total number of errors of the copy making it possible to detect that it is a copy. The redundancies present in the identification image make it possible to correct printing and/or reading defects and the wear or erasure marks of the identification image.

In embodiments, the means of obtaining biometric data is configured to obtain a photograph of the head of the person or animal and the biometric data encoding means is configured to encode the photograph to form the identification image.

Thanks to these provisions, a decoder can cause the photograph of the person or animal to appear and verify its identity.

In embodiments, the biometric data encoding means is configured to encode the biometric data into at least one hundred thousand elementary cells.

Thanks to these provisions, a photograph compressed into four kilobytes can be represented with several redundancies. This photograph can accordingly be very precise.

In embodiments, the biometric data encoding means is configured to apply a redundancy factor equal to at least three.

Thanks to these provisions, the detection and correction of image printing or capture errors and of the image's wear or erasure can be realized even with a lot of lost data.

In embodiments, each encoding means is configured to form an image that can be printed at a resolution of 600 dots per inch while retaining its ability to be read.

In embodiments, the means of obtaining biometric data is configured to obtain data representative of at least one fingerprint of the person and the biometric data encoding means is configured to encode the data representative of the fingerprint.

Thanks to these provisions, the identification document bearer's identity can be verified by comparing each piece of fingerprint data represented by the identification image with the corresponding piece of fingerprint data supplied at the time of the identification.

In embodiments, the device that is the subject of the invention comprises a means of forming on the document at least one surface for depositing a fingerprint.

Thanks to these provisions, the capture of at least one fingerprint of the bearer of the identification document is realized directly on the identification document after pressing the finger in question of the corresponding deposit surface.

In embodiments, the means of encoding an authentication image is configured to form an image that is suitable, when printed by the printing means, for comprising at least one tenth of elementary cells whose content is erroneous.

Thanks to these provisions, the detection of the copy of the document is simplified because it requires an error rate of at least fifteen percent.

In embodiments, the means of encoding an authentication image is configured to encode at least one item of identification information of the document bearer in the authentication image.

Thanks to these provisions, the authentication code, which cannot be forged, identifies the bearer of the document, even if the identification image has been forged.

In embodiments, the means of encoding an authentication image is configured to realize a permutation of elementary cells by utilizing a hash function that utilizes a hashing key.

Thanks to these provisions, retrieval of identification data by malicious persons is made more complex.

In embodiments, at least one of the encoding means is configured to realize a permutation of elementary cells representative of a fingerprint by utilizing a hash function that utilizes a hashing key.

Thanks to these provisions, retrieval of fingerprint data by malicious persons is made more complex.

In addition, by utilizing a function inverse to the hash function when reading the identification image thus realized, the error rate is decreased and therefore the fingerprint is authenticated.

According to a second aspect, this invention envisages a device for verifying the authenticity of an identification document and the identity of a person or animal.

According to a third aspect, this invention envisages a method for producing a document carrying the identification of a person or animal.

According to a fourth aspect, this invention envisages a method for verifying the authenticity of an identification document and the identity of a person or animal.

In embodiments, the verification method comprises the step of displaying biometric data after a step of capturing biometric data from the document bearer and a step of verifying the match between the captured biometric data and the decoded biometric data.

Thanks to these provisions, malicious persons cannot get access to the data represented by the identification image. Forging the document is thus made more difficult.

In addition, only the bearer of the document can thus access data stored on the document.

According to a fifth aspect, this invention envisages an identification document of a person or animal.

In embodiments, the document that is the subject of the invention comprises a surface for depositing at least one fingerprint.

As the particular characteristics, advantages and aims of this verification device and of these methods and of this document are similar to those of the device for producing a document that is the subject of the present invention, they are not repeated here.

BRIEF DESCRIPTION OF THE DRAWINGS

Other advantages, aims and particular features of the present invention will become apparent from the description that will follow, made, as a non-limiting example, with reference to drawings included in an appendix, wherein.

DETAILED DESCRIPTION OF EMBODIMENTS

It must now be noted that the figures are not to scale.

Figure 1:
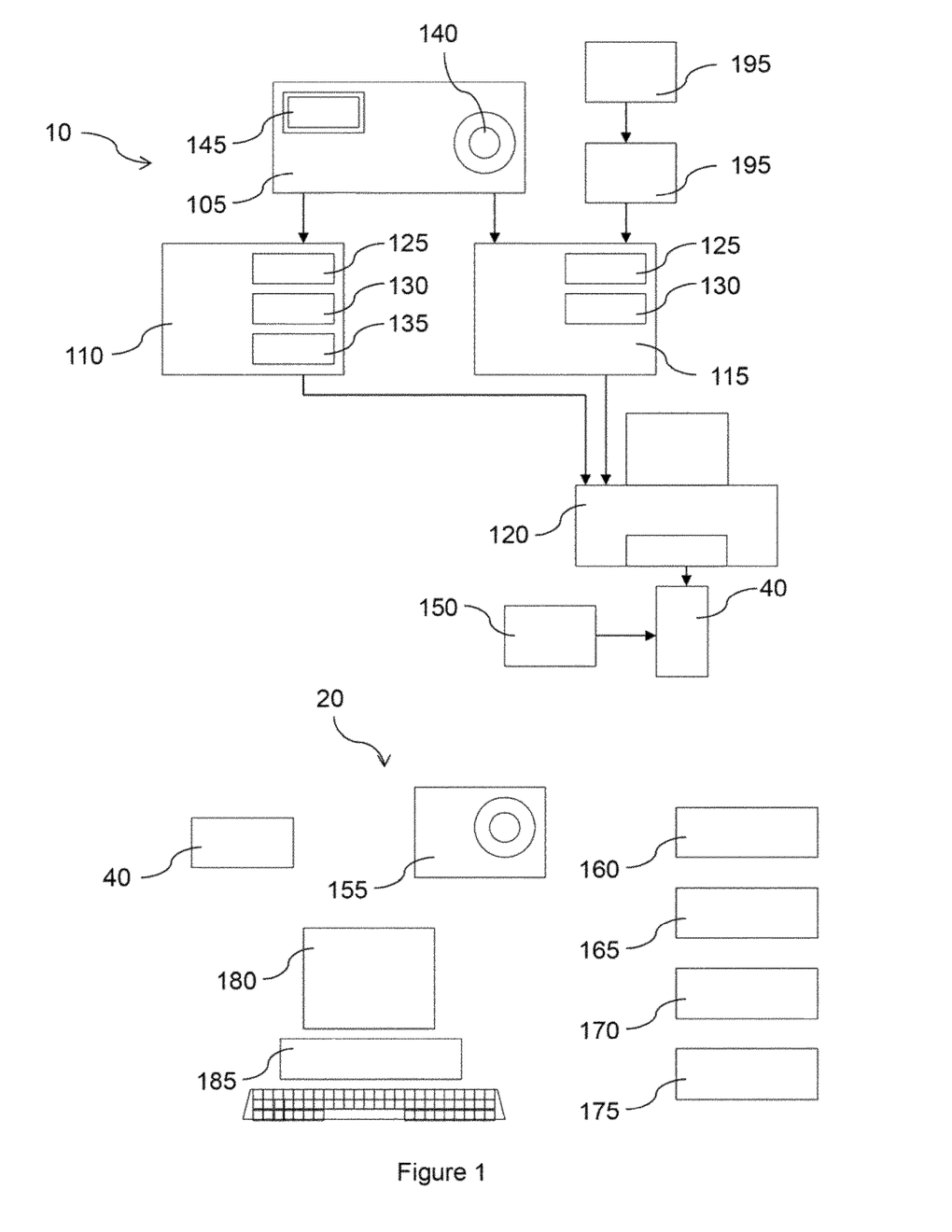
FIG. 1 represents, schematically, particular embodiments of the device for realizing an identification document and of the verification device, which are the subjects of the present invention.
Figure 4:
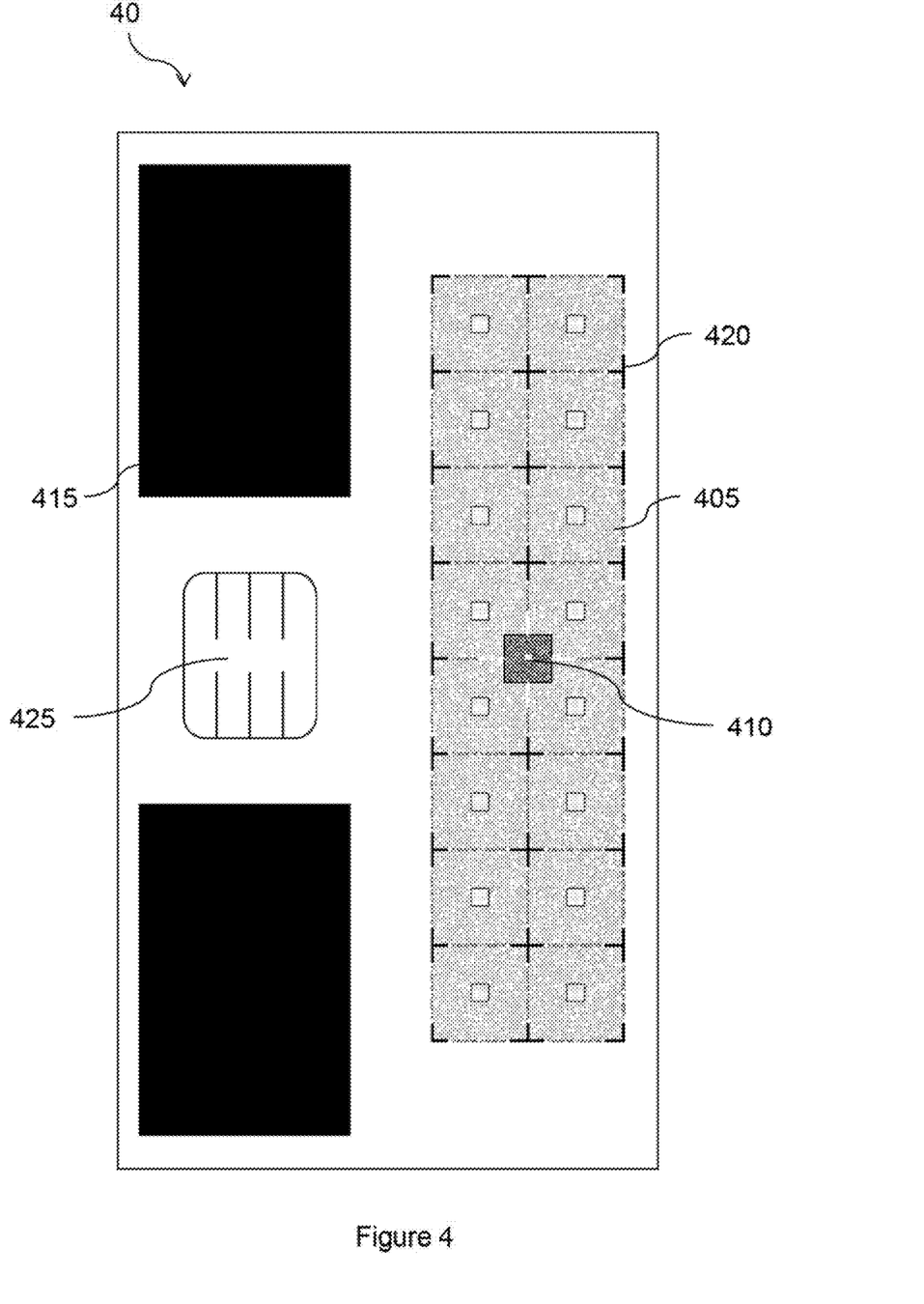
FIG. 4 represents, schematically, an identification document that is the subject of the present invention.

FIG. 1 shows a device 10 for producing a document 40 (an example of which is shown in FIG. 4) bearing identification data of a person or animal. In the remainder of the description, such a document is referred to as an "identification document". This document 40 may, for example, be in the form of an identity card, a driving license, a passport, a membership card, a medical card or a payment card.

The device 10 comprises:
- a means 190 for determining printing conditions of said document;
- a means 105 for obtaining the biometric data of said person or said animal;
- a means 110 for encoding the biometric data in order to form a digital identification image comprising redundancies;
- a means 195 of determining physical characteristics of cells of at least one shape, according to the print conditions, such that the proportion of cells printed with a print error coming solely from unanticipated unknowns in printing is greater than a predefined first value and less than a predefined second value;
- an encoding means 115 for forming an authentication image for the document, said authentication image having elementary cells; and
- a means 120 for printing the authentication image and the identification image on the document 40 in order to generate random errors in the printed elementary cells of the authentication image.

The means 105 for obtaining biometric data representative of this person or animal may comprise at least a sensor, for example a sensor of an image of the head of the identification document's future bearer or a fingerprint sensor. The means 105 may also comprise a means of receiving data held in a computer memory, for example a dataset from a bank, a tax authority or a social security body, which dataset holds biometric data such as the height, hair or eye color of the identification document's future bearer.

The means 110 of encoding biometric data to form a digital identification image utilizes a central processing unit 125 operating according to a program 130, whose instructions are kept in a memory 135. This program implements, for example, the steps shown in FIG. 2.

The encoding means 115 for forming an authentication image for the document, also utilizes the central processing unit 125 and the program 130.

The means 120 for printing the authentication image and the identification image on the document 40 consists, for example, of a laser, inkjet or piezoelectric crystal printer.

The printing means 120 is configured to generate, at the resolution of the authentication image to be printed, random errors in the printed elementary cells of the authentication image, as explained in the detail of means 190 and 195.

For this reason, the biometric data of the document's bearer are encoded and therefore particularly difficult to forge. In addition, the printed authentication image has, as soon as it is first printed on the document, a large quantity of random errors that cause a copy, made with the same printing means as the original, of the printed identification image to comprise even more errors, the total number of errors of the copy making it possible to detect that it is a copy. The redundancies present in the identification image make it possible to correct printing and/or reading defects and the wear or erasure marks of the identification image.

In regard of the means 190 and 195, in the remainder of the description, "print error" refers to a modification in a cell's appearance that modifies the interpretation of the information borne by this cell, during an analysis free from reading or capture errors, for example, microscopic. It is noted that if the cells often originally have binary values, the captured values are frequently in grey-scale and therefore there is a non-binary value associated to a cell; this latter can, for example, be interpreted as a probability of the cell's original binary value.

If one uses, for reading, a limit value of the gray level to determine if a cell is of one color (e.g. white) or another (e.g. black), a printing error consists of an erroneous interpretation of the color of the initial digital document's cell.

The inventors have discovered that, when the proportion of print errors is above a predefined value, copying the shape by utilizing the same print means as the original print, or analog means, necessarily causes an additional proportion of errors making this copy detectable.

The inventors have also discovered that, depending on given constraints (such as a constraint concerning the "SIM" Secure Information Matrix's number of cells or physical size), there is an optimum proportion of print errors in terms of ability to detect copies. This optimum proportion of print errors corresponds to a given cell size or print resolution, a function of the print means.

Thus, contrary to what might be assumed, the highest print resolution is not necessarily, and is even rarely, a resolution giving the best result in terms of ability to detect copies.

In this case, the native print resolution of the print means needs to be differentiated from the print resolution of the cells, each of which is, generally, made up of a plurality of ink dots, each ink dot corresponding to the native print resolution. Expressly, a SIM's print resolution cannot be varied. In effect, most print means print in binary (presence or absence of an ink dot) with a fixed resolution, and the grey or color levels are simulated by the various screening techniques. In the case of offset printing, this "native" resolution is determined by the plate's resolution, which is, for example, 2,400 dots/inch (2,400 dpi). Thus, a grey-scale image to be printed at 300 pixels/inch (300 dpi) may in reality be printed in binary at 2,400 dpi, each pixel corresponding approximately to 8×8 raster dots.

While the print resolution cannot, generally, be varied, on the other hand the size in pixels of the SIM's cells can be varied, in such a way that one cell is represented by several print dots. Thus, a cell can, for example, be represented by a square block of 1×1, 2×2, 3×3, 4×4 or 5×5 pixels (non-square blocks are also possible), corresponding respectively to resolutions of 2,400, 1,200, 800, 600 and 480 cells/inch.

In embodiments, during the step determining the physical characteristics of cells, the dimension of the cells to be printed is determined.

In embodiments, during the step determining the physical characteristics of cells, a sub-section of the cells is determined, a sub-section that has a uniform and variable color for representing different values of an item of information, said sub-section being strictly less than said cell.

In embodiments, the first predefined value is above 5%, preferably above 10% and even more preferably above 15% then 20%.

In embodiments, the second predefined value is below 30% and preferably above 25%.

Before giving the details of the various particular embodiments of certain aspects of this invention, the definitions that will be used in the description are given below.

"information matrix": this is a machine-readable representation of information, generally affixed on a solid surface (unlike watermarks or steganographies, which modify the values of the pixels of a design to be printed). The information matrix definition encompasses, for example, 2D bar codes, one-dimensional bar codes and other less intrusive means of representing information, such as "Dataglyphs" (data marking);

"cell": this is an element of the information matrix that represents a unit of information;

"document": this is any (physical) object whatsoever bearing an information matrix;

"marking" or "printing": any process whereby one goes from a digital image (including an information matrix, a document, etc) to its representation in the real world, this representation generally being made on a surface: this includes, in a non-exclusive way, ink jet, laser, offset and thermal printing, as well as embossing, laser engraving and hologram generation. More complex processes are also included, such as molding, in which the digital image is first engraved in the mold, then molded on each object (note that a "molded" image can be considered to have three dimensions in the physical world even if its digital representation comprises two dimensions). Note also that several of the methods mentioned include several transformations, for example conventional offset printing (unlike "computer-to-plate" offset), including the creation of a film, said film serving to create a plate, said plate being used in printing. Other methods also allow an item of information to be printed in the non-visible domain, either by using frequencies outside the visible spectrum, or by inscribing the information inside the surface, etc, and "capture": any process by which a digital representation of the real world is obtained, including the digital representation of a physical document containing an information matrix.

Throughout the description that will follow, shapes that are square overall are utilized. However, the present invention is not restricted to this type of shape but, on the contrary, extends to all shapes that can be printed. For example, shapes constituted of SIMs with different resolutions and different levels of inking, as described above, can be utilized, which would have the advantage, in particular, that at least one SIM corresponds to an optimum resolution and an optimum inking density.

Throughout the description, a filling of the printed shape, which can be represented by a matrix of cells, is utilized. However, the present invention is not restricted to this type of shape but, on the contrary, extends to all filling by cells, of identical or different shapes and sizes.

By way of introduction to the description of particular embodiments of the method and device that are subjects of the present invention, it is noted that the result of the degradation of an information matrix is that certain cells cannot be correctly decoded.

Each step in creating the information matrix is carried out with the aim of the original message being readable without error, even if, and this is a wished-for effect, the initial reading of the information matrix is marred by errors. In particular, one of the aims of this information matrix creation is to use the number or rate of errors of encoded, replicated, swapped or scrambled messages in order to determine the authenticity of a mark of the information matrix and therefore of the document that bears it.

In effect, the rate of this degradation can be adjusted according to print characteristics, such that the production of a copy gives rise to additional errors, resulting in an error rate that is, on average, higher when a copy is read than when an original is read.

In order to understand why measuring the message's error rate can be sufficient to determine whether a document is an original or a copy, an analogy with communications systems can be useful. In effect, the passage of the encoded, scrambled message to the information matrix that represents it is none other than a modulation of the message, this modulation being defined as the process by which the message is transformed from its original form into a form suitable for transmission over a channel. This communications channel, namely the information transmission medium that links the source to the recipient and allows the message to be transported, differs depending on whether the captured information matrix is a captured original information matrix or a captured copied information matrix. The communication channel may vary: thus the "communications channel of an original" and the "communications channel of a copy" are differentiated. This difference can be measured in terms of the signal/noise ratio, this ratio being lower for a captured copied information matrix.

The coded message extracted from a captured copied information matrix will have more errors than the coded message extracted from a captured original information matrix. The number or rate of errors detected is, in accordance with certain aspects of the present invention, used to distinguish a copy from an original.

The communications channel of an original and the communications channel of a copy are described advantageously in terms of the sub-channels comprising them, these differing in part in the two cases. In the following account, each sub-channel of the transmission channel of the signal, i.e. of the information matrix, is an analog-to-digital or digital-to-analog transformation.

Figure 5:
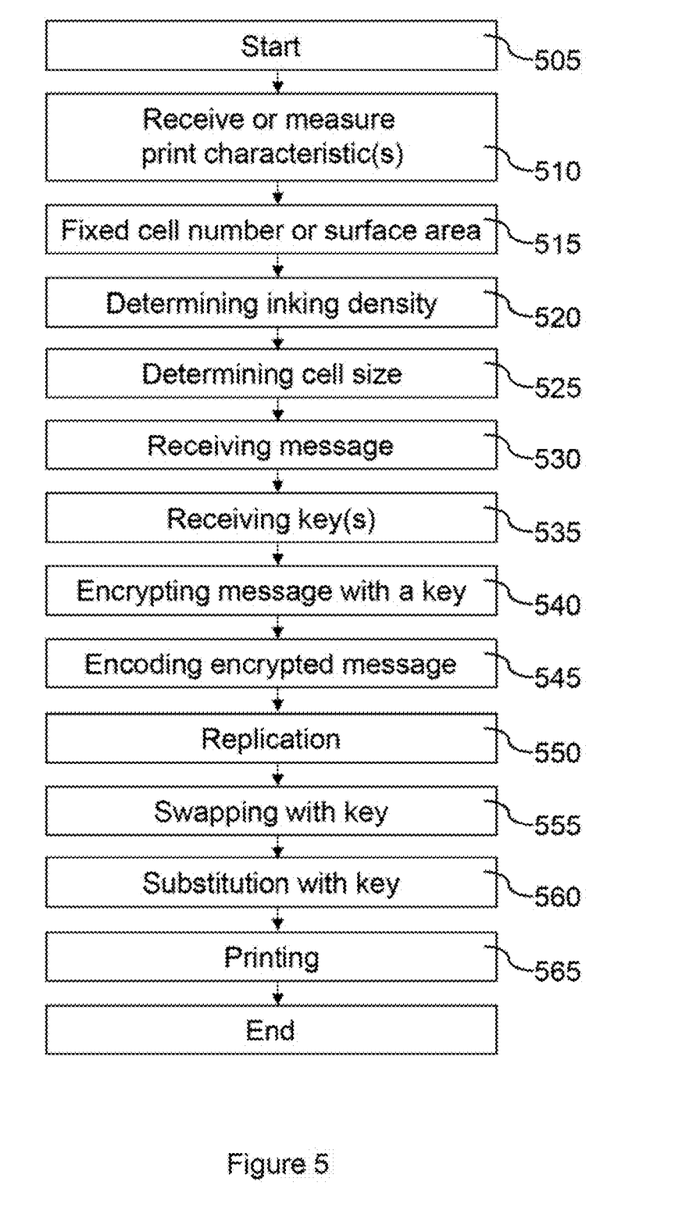
FIG. 5 represents, in the form of a logical diagram, steps utilized to realize an authentication image.

The logical diagram illustrated in FIG. 5 shows different steps in generating an information matrix and marking a document, according to a particular embodiment of certain aspects of the method that is the subject of the present invention.

After starting, during a step 505, at least one marking or print characteristic is received or, during a step 510, measured, for example the type of printing, the type of medium, the type of ink used. Then, during a step 515, it is determined whether the surface area of the SIM or its cell number is fixed for the application in question or the client in question. During a step 520, the inking density corresponding to the marking/print characteristics is determined, for example, by reading the density corresponding to the print characteristics in a database or look-up table. During a step 525, the size of the SIM's cells is determined, for example by reading the cell size corresponding to the print characteristics in a database or look-up table. These correspondences are aimed at obtaining a good print quality and a proportion of print errors between a predefined first value and a predefined second value, for example 5%, 10%, 15% or 20% for the predefined first value and 25% or 30% for the predefined second value.

Then, during a step 530, a message to be carried by a document is received, this message generally being a function of an identifier of the document, and, during a step 535, at least one secret encryption and/or scrambling key.

The original message represents, for example, a designation of the document, the owner or owners of the attached intellectual property rights, a manufacturing order, a destination for the document, a manufacturing service provider. It is constituted according to techniques known per se. The original message is represented in a predefined alphabet, for example in alphanumeric characters.

During a step 540, the message is encrypted with a symmetric key or, for preference, with an asymmetric key, for example a key pair type of the PKI (acronym for "public key infrastructure") public key infrastructure, to provide an encrypted message. Thus, in order to increase the level of security of the message, the message is encrypted or enciphered in such a way that a variation of a single item of binary information of the message, on input to the encryption, makes a large amount of binary information vary on output from the encryption.

The encryption operates in general on blocks of bits, of fixed size, for example 64 bits or 128 bits. The encryption algorithms DES (acronym for "data encryption standard"), with a key of 56 bits and a message block size of 64 bits, triple-DES, with a key of 168 bits and a message block size of 64 bits, and AES (acronym for "advanced encryption standard"), with a key of 128, 192 or 256 bits and a message block size of 128 bits, can be used since they are widely used and recognized as being resistant to attacks. However, many other encryption algorithms, block-based or sequential, can also be used. Note that, in theory, the block encryption algorithms provide encrypted messages with the same size as the initial message, insofar as this is a multiple of the block size.

During a step 545, the encrypted message is encoded in order to generate an encoded encrypted message. For preference the encoding utilizes convolutional encoding, which is very quick to generate, the decoding itself being rapid by using, for example, the very well-known method developed by Viterbi. If the convolutional encoding used utilizes a nine-degree polynomial generator, and the code rate is two bits on output for one bit on input, a code increase will be obtained of seven dB with respect to the same message simply replicated. This results in a much lower risk of error on decoding. For a message to be encoded containing 128 bits, with the convolutional code described above, there will be an encoded message of 272 bits (there are two bits on output for each of the 128 bits of the code and the eight bits belonging to the encoder's memory for a nine-degree polynomial generator). Note however that many other types of encoding can be performed (arithmetical coding, turbo-code, etc) following the same principle.

For preference, this encoded encrypted message is therefore written in a binary alphabet, i.e. it is comprised of "0" and "1".

During a step 550, the encoded encrypted message is inserted and replicated in a list of available cells of an information matrix, the unavailable areas of which bear synchronization, alignment or position symbols, or location assistance patterns that, in embodiments, are determined from a secret key. The alignment patterns are, for example, matrices of 9×9 pixels distributed periodically in the information matrix. The encoded encrypted message is thus replicated, or repeated, so that each item of binary information will be represented several times, to correspond to the number of cells available in the information matrix. This replication, which is related to repetition or redundancy encoding, makes it possible to significantly reduce the error rate of the encoded message that will be supplied on input to the convolutional code decoding algorithm. The errors not corrected by the repetitions will be corrected by the convolutional code in most cases.

During steps 555 and 560, the replicated encoded encrypted message is scrambled, according to techniques known as "scrambling", to provide a scrambled encoded encrypted message.

The function of scrambling the replicated encoded encrypted message consists for preference of successively applying a swap, step 235, and a substitution, step 560, each according to a second secret key, possibly identical to the first secret key, of the message's binary values. The substitution is for preference made using an "exclusive or" function and a pseudo-random sequence.

In this way, the scrambling of the encoded encrypted message is performed in a non-trivial way, by utilizing a secret key, which can be a key identical to the key used for encrypting the message or a different key. Note that if the key is different, in particular embodiments, it can be calculated from a function of the key used for the encryption.

Using a secret key, both for encrypting the message and for scrambling the encoded message, allows a high level of security against counterfeits to be obtained. For comparison, as the existing methods of creating 2D bar codes do not scramble the encoded message, the counterfeiter can easily recreate an original information matrix after having decoded the captured information matrix's message; even if the decoded message is encrypted, they do not need to decrypt said message to identically recreate the information matrix.

The scrambling consists in this case for preference in a combination of swapping, step 555, and, step 560, using an "XOR" or "exclusive or" function. In effect, this type of scrambling avoids an error being propagated (there is no so-called "avalanche" effect: an error on one element of the scrambled message results in one, and only one, error in the descrambled message). The avalanche effect is not desirable since it would make reading the information matrix more difficult when there is one single error in the scrambled message. Yet, as has been seen, errors play an important role in the utilization of the present invention.

The swap, step 555, is determined based on a swapping algorithm to which a key is supplied, said key allowing all the swaps performed to be generated pseudo-randomly. The "exclusive or" function, step 560, is applied between the swapped sequence (the size of which corresponds to the number of cells available) and a binary sequence of the same size also generated from a key. It is noted that if the message is not in binary mode (cells able represent more than two possible values), the swap can be performed in the same way, and the "exclusive or" function can be replaced by a function that performs a modulo addition for the number of possible values for the message with a pseudo-randomly generated sequence comprising the same number of possible values as the scrambled message.

Each of the scrambled replicated encoded encrypted message's binary data is thus modulated in a cell of the information matrix by assigning one of two colors (for example black and white) to binary data "0" and the other color to binary data "1", the correspondence able to vary over the surface area of the image.

Depending on the print method, step 565, just one of the two colors can be printed, the other corresponding to the original color of the substrate, or having been pre-printed as "background". For print methods that produce a physical relief (for example embossing or laser engraving), one of the two colors associated to a certain binary value will be chosen, for example arbitrarily.

Alignment blocks, with a value that is known or can be determined by the detector, can be inserted in the matrix. These blocks can be inserted at regular intervals from the upper left corner of the matrix, for example every 25 pixels, with a size of 10×10 pixels. It is therefore noted that the matrix will have 5×5=25 alignment blocks, each having 100 pixels, for a total of 25×100=2050 alignment pixels, or 2050 message cells. The number of cells available for replicating the encoded message will therefore be 12,100−2,500=9,600. Given that, as described above, the encoded message comprises 272 bits, said message may be fully replicated 35 times, and partially a 36$^{th}$ time (the first 80 bits of the encoded message). It is noted that these 35 replications make it possible to improve the encoded signal's signal/noise ratio by more than 15 dB, which allows a very low risk of error when the message is read.

During the step 565, a document is marked with the information matrix, for example by printing or engraving, at a marking resolution such that the representation of the information matrix comprises errors due to said marking step in such a way that any reading of said information matrix reveals a non-zero error rate. During this marking step 565, a mark is therefore formed comprising, as a result of the physical conditions of the marking, at least partially random or unpredictable local, i.e. affecting representations of cells of the information matrix individually, errors.

The physical conditions of the markings comprise, notably, the physical tolerances of the means of marking, carrier, and, in particular, its surface state and material, for example ink, possibly deposited. The term "unpredictable" means that one cannot determine, before the physical marking of the document, which cells of the information matrix will be correctly represented by the marking and which cells of the matrix will be erroneous.

For each of the secret keys used, if the previous key has been discovered by a third-party the secret key just needs to be changed in order to return to the initial level of security.

It is noted that the encoding and possible replication enable, firstly, the robustness of the message to be increased significantly with regard to degradations and, secondly, the document to be authenticated, by estimating or measuring the number or rate of errors affecting a reading of the mark of the information matrix.

When original information matrices, captured and printed with a resolution of 1,200 points per inch, with cells of 8×8, 4×4, 2×2 et 1×1 pixel(s), are examined, it is noted that the, high resolution, reading of the binary value represented by each cell:

presents practically no errors with cells of 8×8 pixels;
presents some errors with cells of 4×4 pixels;
presents many errors with cells of 2×2 pixels; and
presents, for the cells of 1×1 pixels, an error rate that is so close to the maximum of 50% that the error corrections would probably be insufficient and the degradation due to copying would be unnoticeable because the error rate would be unable to change.

An optimum lies between the extreme dimensions of the cells and, in the limited choice represented here, one of the cases in which the cells have 4×4 or 2×2 pixels is optimal. A method for determining this optimum is given below.

Below is a description, in greater detail, of how the SIM's conception is optimized according to the print conditions.

It is recalled, firstly, that the SIM in digital format, before printing, contains no errors. In effect, there is no random, deliberate, or "artificial" generation of errors. These cases are not, moreover, print errors according to this invention.

Thus it is the printed version of this SIM that contains errors. The errors in question, utilized in the present invention, are not caused artificially, they are caused naturally. In effect, the errors in question are caused, in a random and natural way, during the marking step, by printing the SIM at a sufficiently high resolution.

These errors are necessary, even though their mix is delicate. In effect, if the SIM is marked without errors (or with a very low error rate), a copy of this SIM produced under comparable print conditions will not comprise more errors. Thus, an "almost perfectly" printed SIM can obviously be identically copied with an analog means of marking. In contrast, if the SIM is marked with too high a number of errors, only a minority of cells will be likely to be copied with additional errors. It is therefore necessary to avoid a marking resolution that is too high, since the possibility of distinguishing originals from copies is reduced.

Expressly, a SIM's print resolution cannot be varied. In effect, most print means print in binary (presence or absence of an ink dot) with a fixed resolution, and the grey or color levels are simulated by the various screening techniques. In the case of offset printing, this "native" resolution is determined by the plate's resolution, which is, for example, 2,400 dots/inch (2,400 dpi). Thus, a grey-scale image to be printed at 300 pixels/inch (300 ppi) may in reality be printed in binary at 2,400 dpi, each pixel corresponding approximately to 8×8 dots of the raster.

While the print resolution cannot, generally, be varied, the size in pixels of the SIM's cells can, on the other hand, be varied, such that one cell is represented by several print dots and in particular embodiments, the part of each cell whose appearance is variable, i.e. printed in black or white, in binary information matrices. Thus, a cell can, for example, be represented by a square block of 1×1, 2×2, 3×3, 4×4 or 5×5 pixels (non-square blocks are also possible), corresponding respectively to resolutions of 2,400, 1,200, 800, 600 and 480 cells/inch.

According to certain aspects of the present invention, one determines the number of pixels of the cell leading to a natural degradation on printing that make it possible to maximize the difference between originals and copies.

Thus using an error rate between 20 and 25% is preferred, as this is found between the optimums of copy detection. The optimum of 19.1% corresponds to the case in which there is a fixed number of cells, for example if the reading procedure can only read the SIMs with a fixed number of cells, while the optimum of 27.1% corresponds to the case in which there is no constraint on the number of cells, while there is a constraint on the physical dimension of the SIM.

It should be noted that, in order to facilitate autonomous authentication of the information matrix, the decision threshold or thresholds, or other parameter relating to the printing, can be stored in the message or messages contained in the information matrix. Thus, it is not necessary to interrogate the database for these parameters, or to store them on the autonomous verification modules. In addition, this makes it possible to manage applications or information matrices, of the same nature from the application point of view, that are printed by different methods. For example, the information matrices applied to the same type of document, but printed on different machines, might use the same key or keys. They may have print parameters stored in the respective messages.

Below is a description of how, by measuring the message's error quantity, a decision can be made concerning the document's authenticity according to said error quantity. For that, it is, in theory, necessary to decode said message, since if the message is unreadable, the errors with which it is affected cannot be determined. Nevertheless, if the marking has significantly degraded the message (which is especially the case with copies), or if a large quantity of information is carried, the message might not be readable, in which case an error rate cannot be measured. It would be desirable to be able to measure the error quantity without having to decode said message.

Secondly, the step decoding the message utilizes algorithms that can turn out to be costly. If one only wants to authenticate the message, rather than read it, the decoding operation is only performed for the purpose of measuring the error rate; it would be preferable to eliminate this step. In addition, if one wants to make a finer analysis of the error rate, the replicated message has to be reconstructed. This reconstruction of the original replicated message can turn out to be costly, and it would be preferable to avoid it.

However, at the origin of one of the aspects the present invention, it was discovered that, for the purpose of measuring an error quantity, it is not, paradoxically, necessary to reconstitute the original replicated message, or even to decode the message. In effect, a message's error quantity can be measured by exploiting certain properties of the message itself, at the time of the encrypted message's estimation.

Take the case of a binary message. The encoded message is comprised of a series of bits that are replicated, then scrambled, and the scrambled message is used to constitute the SIM. The scrambling comprises, as a general rule, a swap and, optionally, the application of an "exclusive or" function is generally dependent on one or more keys. Thus, each bit of the message can be represented several times in the matrix. During the step accumulating the estimation of the encoded message, all the indicators of the value of each bit or element of the message are accumulated. The statistical uncertainty of the bit's value is generally significantly reduced by this operation. This estimate, which is considered to be the correct value of the bit, can therefore be used in order to measure the error quantity. In effect, if the marked matrix comprises relatively few errors, these will basically all be corrected during the accumulation step, and thus it is not necessary to reconstruct the encoded message for which one already has a version without errors. In addition, if some bits of the encoded message have been badly estimated, in general the badly estimated bits will have a reduced impact on the measurement of the error quantity.

An algorithm is given below for steps measuring the error quantity without decoding the message, for binary data.
 for each bit of the encoded message, accumulate the values of the indicators,
 determine, by thresholding, the (most probable) value of the bit ("1" or "0"); the most probable estimate of the encoded message is obtained and
 count the number of indicators (for each cell, the density, or normalized value of luminance) that correspond to the estimate of the bit of the corresponding encoded message. In this way, an integer number of errors, or a rate or percentage of erroneous bits can be measured.

Alternative to this last step, one can retain the value of the indicator and measure a global index of similarity between the values of the indicators and the corresponding estimated bits of the encoded message. An index of similarity may be the coefficient of correlation, for example.

In a variant, a weight or coefficient can be associated, indicating the probability that each estimated bit of the encrypted message is correctly estimated. This weight is used to weight the contributions of each indicator according to the probability that the associated bit is correctly estimated. A simple way to implement this approach consists of not thresholding the accumulations corresponding to each bit of the encoded message.

It is noted that the noisier the message is, the higher the risk that the estimated bit of the encrypted message is erroneous. This gives rise to a bias such that the measurement of the error quantity under-estimates the actual error quantity. This bias can be estimated statistically and corrected when the error quantity is measured.

It is interesting to observe that, with this new approach to measuring the error quantity, a SIM can be authenticated without needing to know, directly or indirectly, the messages needed for its conception. It is simply necessary to know the groupings of cells that share common properties.

In variants, several sets of indicators are obtained, coming from different preprocessing operations applied to the image (for example, a histogram transformation), or from reading at different positions of the SIM; an error quantity is calculated for each set of indicators, and the lowest error rate is retained; in order to speed up the calculations, the estimation of the encoded message can be done only once (the probability is low of this estimation changing for each set of indicators).

It can be considered that images (or matrices) are generated whose sub-sections share common properties. In the simplest case, sub-groups of cells or pixels have the same value, and they are distributed pseudo-randomly in the image according to a key. The property in question does not need to be known. On reading, it is not necessary to know this property, since it can be estimated. Thus, the measurement of a score allowing the authenticity to be indicated does not need a reference to the original image, or a determination of a message. Therefore, in embodiments, the following steps are utilized to perform document authentication:

a step of receiving a set of sub-groups of image elements (for example, values of pixels), each sub-group of image elements sharing the same characteristic, said characteristics not necessarily known;

an image capture step;

a step of measuring characteristics of each image element;

a step of estimating characteristics common to each sub-group of image elements;

a step of measuring the correspondence between said estimates of the characteristics common to each sub-group, and said measured characteristics of each of the image elements; and a step of deciding on the authenticity, according to said measurement of correspondence.

In other embodiments, which are now going to be described, it is not necessary to know or reconstruct the original image, nor to decode the message that it comprises, in order to authenticate a SIM. In fact, on creation, it is just necessary to create an image comprised of subsets of pixels that have the same value. On detection, it is just necessary to know the positions of the pixels that belong to each of the subsets. The property, for example the value of pixels belonging to the same subset, does not have to be known: it can be found during reading without needing to decode the message. Even if the property is not found correctly, the SIM can still be authenticated. We call this new type of SIM "random authentication pattern" ("RAP") below. The word 'random' signifies that, inside a given set of possible values, the RAP can take any of its values whatsoever, without the value being stored after the image creation.

For example, assume that there is a SIM comprised of 12,100 pixels, i.e. a square of 110×110 pixels. These 12,100 pixels can be divided into 110 subsets each having 110 pixels, such that each pixel is located in exactly one subset. The division of the pixels into subsets is done pseudo-randomly, for preference with the help of a cryptographic key, such that without the key it is not possible to know the positions of the different pixels belonging to a subset.

Once the 110 subsets have been determined, a random or pseudo-random value is assigned to the pixels of each subset. For example, for binary pixel values the value "1" or the value "0" can be assigned to the pixels of each subset, for a total of 110 values. In the case of values determined randomly, 110 bits are generated with a random generator, these 110 bits able to be subsequently stored or not. It is noted that there are $2^{110}$ possible RAPS for a given subset division. In the case of values generated pseudo-randomly, a pseudo-random number generator is utilized, to which a cryptographic key is supplied, generally stored subsequently. It is pointed out that for such a generator based on the SHA1 hash function the key is 160 bits, whereas only 110 bits need to be generated in our example. Thus the use of the generator can have a limited use.

Knowing the value of each of the pixels, an image can then be assembled, in our case of 110×110 pixels. The image can be a simple square, with the addition of a black border making its detection easier, or can have an arbitrary shape, contain microtext, etc. Groups of pixels with known values serving for a precise image alignment can also be used.

The image is marked in such a way as to optimize its degree of degradation, according to the marking quality, itself dependent on the substrate quality, the precision of the marking machine and its settings. Methods are given below for this.

Detection from a captured image of a RAP is carried out as follows. Methods of processing and recognizing images, known to the person skilled in the art, are applied so as to locate the pattern in the captured image with precision. Then, the values of each pixel of the RAP are measured (often on a scale of 256 levels of grey). For convenience and the uniformity of the calculations, they can be normalized, for example on a scale of −1 to +1. They are then grouped together by corresponding subset, in our example to subsets of 110 pixels.

Thus, for a subset of pixels having, at the beginning, a given value, there will be 110 values. If the value of the original pixels (on a binary scale) was "0", the negative values (on a scale of −1 to +1) should dominate, while the positive values should dominate if the value was "1". One can therefore assign a value of "1" or "0" to the 110 pixels, and for each of the 110 subsets.

For each of the 12,100 pixels, we have a measured value in the image, possibly normalized, and an estimated original value. An error quantity can thus be measured, for example by counting the number of pixels that coincide with their estimated value (i.e. if the values are normalized over −1 to +1, respectively a negative value coincides with "0" and a positive value with "1"). An index of correlation, etc. can also be measured.

The score ("score" signifying an error rate or a similarity) found is then compared to a threshold to determine whether the captured image corresponds to an original or a copy. Standard statistical methods can be used to determine this threshold.

It is noted that the procedure described does not use data outside the image, except for the composition of the subsets, to determine a score. Therefore, the count of the error quantity can be expressed thus.

The error quantity is equal to the sum, over the subsets, of $(\text{Sum}(\text{Sign}(z_{ij})==f(z_{i1}, \ldots, z_{iM})))$.

where $z_{ij}$ is the value (possibly normalized) of the $i^{th}$ pixel of the $j^{th}$ subset comprising M elements and f is a function estimating a pixel value for the subset, e.g. $f(z_{i1}, \ldots, z_{iM})=\text{Sign}(z_{i1}+ \ldots +z_{iM})$.

In embodiments, such as that represented in FIG. 1, the means 105 of obtaining biometric data comprises an image sensor 140 to obtain a photograph of the head of the person or animal and an image sensor 145 to obtain at least one fingerprint of the person or animal.

The biometric data encoding means 110 is configured to encode the photograph to form the identification image and, possibly, to encode the image of the fingerprint or of its characteristic elements, called "minutiae".

The biometric data encoding means 110 is configured to encode the biometric data into at least one hundred thousand elementary cells. In this way, a photograph compressed into four kilobytes can be represented with several redundancies. This photograph can accordingly be very precise.

In embodiments, the biometric data encoding means is configured to apply a redundancy factor equal to at least three and preferably at least equal to five. For example, the identification image shown in FIG. 4 comprises sixteen squares with a resolution of 100 by 100 cells that may take one of two tints, i.e. 160,000 elementary binary pieces of data or bits, which makes it possible to represent 32,000 bits, i.e. 4,000 bytes, when the redundancy is five.

With such redundancy rates, the detection and correction of image printing or capture errors and of the image's wear or erasure can be realized even with a lot of lost data.

In embodiments, each encoding means 110 and 115 is configured to form an image that can be printed at a resolution of 600 dots per inch while retaining its ability to be read and the printing means 120 prints the identification image and the authentication image at this resolution. For this reason, commercially available laser printers, which utilize at least this resolution, make it possible to generate secure documents for each company and each individual.

Preferably, the authentication image encoding means 115 is configured to encode the image of the fingerprint or of its characteristic elements, called "minutiae". Thus, the identification document bearer's identity can be verified by comparing each piece of fingerprint data represented by the identification image with the corresponding piece of fingerprint data supplied at the time of the identification.

In embodiments, the device 10 also comprises a means 150 of forming on the document at least one surface for depositing a fingerprint. In these embodiments, the capture of at least one fingerprint of the bearer of the identification document is realized directly on the identification document after pressing the finger in question of the corresponding deposit surface.

In embodiments, the means 115 of encoding an authentication image is configured to form an image that is suitable, when printed by the printing means, for comprising at least one tenth of elementary cells whose content is erroneous and preferably, at least fifteen percent. Therefore, the detection of the copy of the document is simplified because it requires an error rate of at least fifteen percent (respectively twenty-three percent) and generally of at least nineteen percent (respectively twenty-seven percent).

In embodiments, the means 115 of encoding an authentication image is configured to encode at least one item of identification information of the document bearer in the authentication image. Therefore, the authentication code, which cannot be forged, identifies the bearer of the document, even if the identification image has been forged.

In embodiments, the means 115 of encoding an authentication image is configured to realize a permutation of elementary cells by utilizing a hash function that utilizes a hashing key. Therefore, retrieval of identification data by malicious persons is made more complex. Preferably, the hashing key is asymmetrical.

In embodiments, at least one of the encoding means 110 and 115 is configured to realize a permutation of elementary cells representative of a fingerprint or of its characteristic elements by utilizing a hash function that utilizes a hashing key. Therefore, retrieval of fingerprint data by malicious persons is made more complex. In addition, by utilizing a function inverse to the hash function when reading the identification image thus realized, the error rate is decreased and therefore the fingerprint is authenticated.

FIG. 1 also shows a device 20 for verifying the authenticity of an identification document 40 and the identity of a person or animal. The device 20 comprises:
- a means 155 for capturing an identification image and an authentication image on the document 40, the authentication image comprising random printing errors in the elementary cells of the authentication image, the identification image representing biometric data representative of this person or animal;
- a means 160 of decoding the authentication image;
- a means 165 of measuring a rate of erroneous elementary cells in the authentication image;
- a means 170 of comparing the rate of erroneous elementary cells to a predefined value;
- a means 175 for decoding the biometric data encoded in the digital identification image that utilizes the redundancies present in the identification image; and
- a means 180 of displaying the decoded biometric data.

The means 155 for capturing an identification image and an authentication image on the document 40 consists, for example, of an image sensor with a resolution of at least fourteen megapixels. This sensor may be incorporated into a dedicated reader or in a Smartphone.

The authentication image encoding means 160 is designed to decode the authentication data by utilizing the redundancies.

The means 165 for measuring a rate of erroneous elementary cells in the authentication image can compare the captured image to an image reconstituted by recoding the authentication data or it can count the number of redundancies utilized to decode the authentication data. This number of erroneous cells proportional to the total number of cells yields an erroneous elementary cells ratio.

The means 170 of comparing compares the rate of erroneous elementary cells to a predefined value. If the ratio of erroneous elementary cells is above the predefined limit value (e.g. 15 or 23 percent, as described above for printing error rates of 10 and 15 percent), the document 40 is considered to be a forgery.

The means 175 for decoding the biometric data encoded in the digital identification image that utilizes the redundancies present in the identification image provides the digital biometric data (e.g. height, hair and eye colors) and the image data (e.g. face and/or fingerprints).

The means 180 for displaying the decoded biometric data consists, for example, of a screen on a dedicated reader, computer or Smartphone.

Preferably, the device 20 comprises a central processing unit 185 to compare the identification biometric data to the data captured on the bearer of the document 40.

In particular, by extracting the characteristic elements of the fingerprint of the bearer of the document 40, captured on the fingerprint depositing surface, then by comparing these extracted elements to the fingerprint characteristic elements encoded in at least one of the two identification and authentication images, the central processing unit 185 determines whether the bearer of the document 40 is the bearer identified by this document 40.

Figure 2:
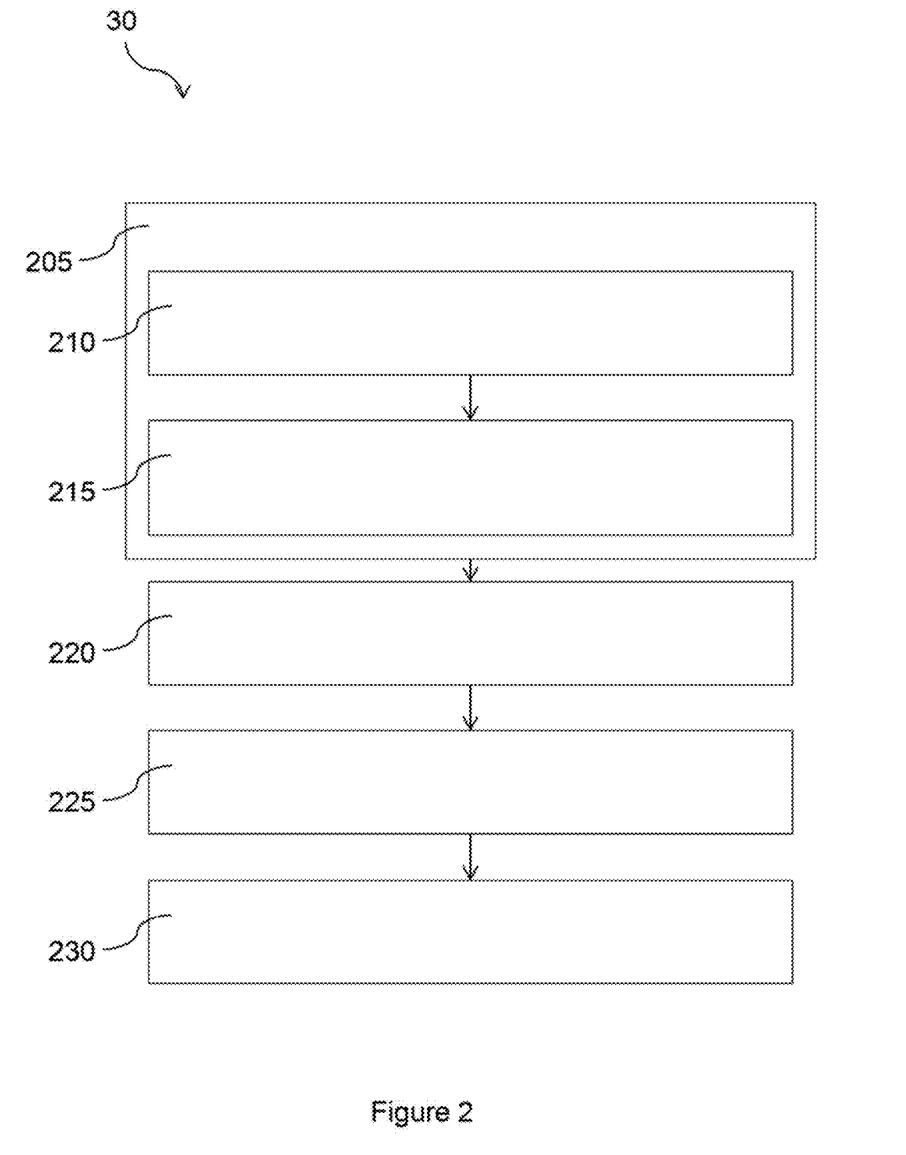
FIG. 2 represents, in the form of a logical diagram, steps in a particular embodiment of the method for realizing an identification document that is the subject of the present invention.

FIG. 2 shows the method 30 for producing a document bearing an identification of a person or animal. The method 30 comprises:
- a step 205 of obtaining the biometric data of said person or said animal;
- a step 220 of encoding the biometric data in order to form a digital identification image comprising redundancies;
- an encoding step 225 for forming an authentication image for the document, said authentication image having elementary cells; and
- a step 230 of printing the authentication image and the identification image on the document in order to generate random errors in the printed elementary cells of the authentication image.

The step 205 comprises a step 210 of capturing biometric data by utilizing at least one sensor and a step 215 of receiving biometric data stored in memories.

The step 220 encodes the biometric data with redundancies, e.g. error detection and correction codes ("CRC" for "Cyclic Redundancy Check").

The step 225 encodes the identification data preferably with redundancies, e.g. CRC error detection and correction codes.

Figure 3:
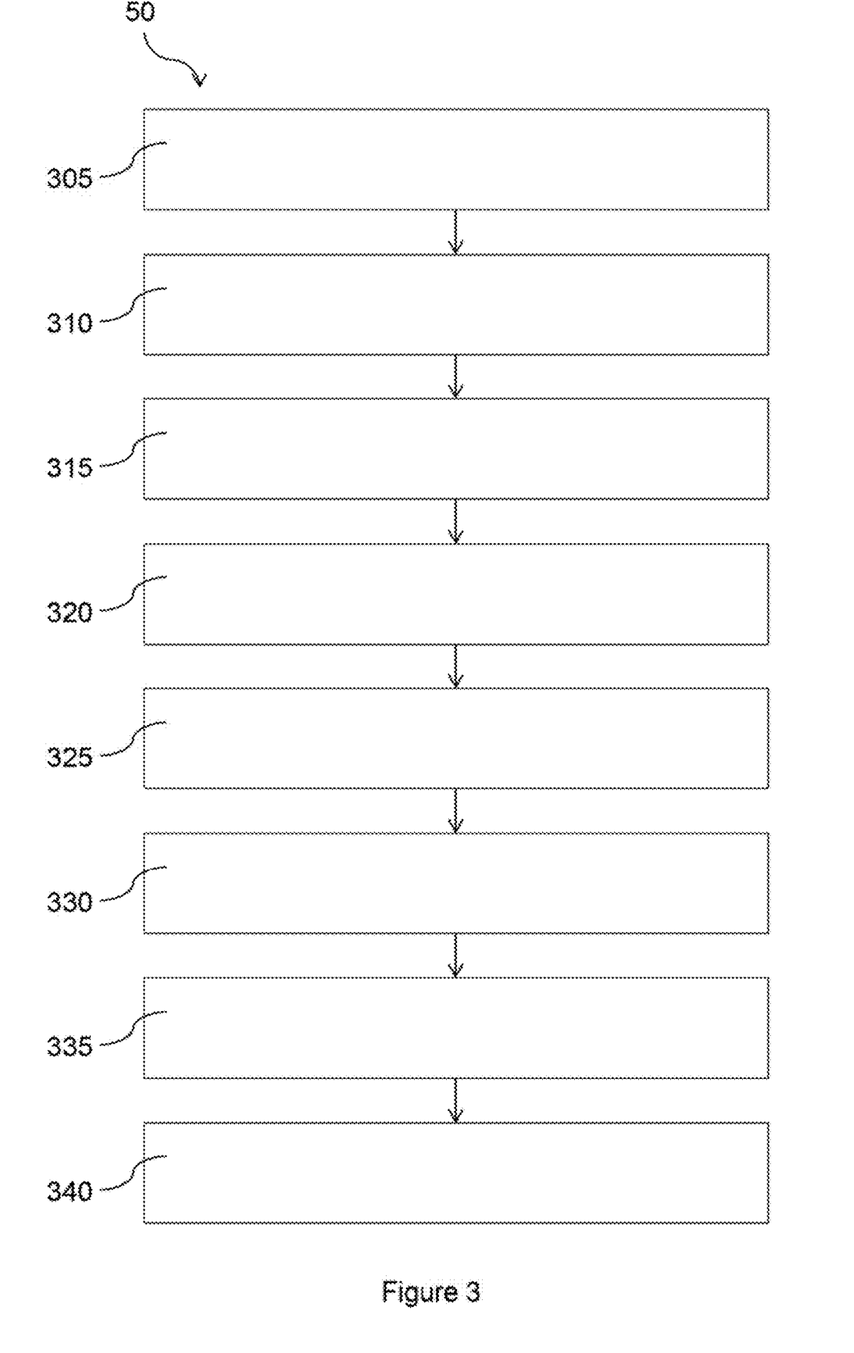
FIG. 3 represents, in the form of a logical diagram, steps in a particular embodiment of the verification method that is the subject of the present invention.

FIG. 3 shows the method 50 for verifying the authenticity of an identification document and the identity of a person or animal. The method 50 comprises:

a step 305 of capturing an identification image and an authentication image on the document, the authentication image comprising random printing errors in the elementary cells of the authentication image, the identification image representing biometric data representative of this person or animal;

a step 310 of decoding the authentication image;

a step 315 of measuring a rate of erroneous elementary cells in the authentication image;

a step 320 of comparing the rate of erroneous elementary cells to a predefined value;

a step 325 of decoding the biometric data encoded in the digital identification image that utilizes the redundancies present in the identification image; and a step 330 of capturing biometric data of the bearer of the document 40;

a step 335 of verifying the match between the captured biometric data and the decoded biometric data; and a step 340 of displaying the decoded biometric data.

In this way, malicious persons cannot get access to the data represented by the identification image. Forging the document is thus made more difficult. In addition, only the bearer of the document can thus access data stored on the document.

For the implementation of the hash functions, the person skilled in the art may refer to the article "Symmetric Hash Functions for Fingerprint Minutiae" by Sergey Tulyakov, Faisal Farooq and Venu Govindaraju, SUNY Buffalo 14228, N.Y., United States of America and to the bibliographical references cited therein.

FIG. 4 shows an identification document 40 of a person or animal, which comprises:

a digital identification image 405 comprising redundancies and representative of the biometric data representative of this person or animal;

an authentication image 410 with elementary cells and random printing errors in the elementary cells; and a surface 415 for depositing fingerprints.

The deposit surface 415 consists, for example, of two surfaces located close to the edge of document 40 such that the bearer applies his thumbs onto this surface 415 when handing the document 40 to the person responsible for checking it.

The surface 415 can be cleaned by simply wiping it with a cloth or handkerchief. For example, the surface 415 is a smooth metalized or black surface.

Each code preferably comprises registration elements 420 to make it possible to scale and perform a rotation of the captured image so as to decode it by locating each cell.

In the embodiment shown in FIG. 4, the document 40 is a microchip card 425.

As can be seen by reading the description above, the present invention can be utilized for highly-secure official documents, as well as for private documents generated and printed using means available to the general public, such as personal computers and laser printers.

In addition, verifying authenticity and obtaining biometric data can be achieved using a general-purpose terminal, for example with a computer application downloaded onto a mobile phone fitted with an image sensor of sufficient resolution.

It should be noted that capturing the authentication image, at a higher resolution, can be achieved with the same sensor as used for capturing the identification image, but at a lesser distance from the document.

The invention claimed is:

1. Device for producing a document carrying an identification of a document bearer, person or animal, comprising:
   a detector to determine physical printing conditions regarding a printer used to mark of the document;
   a sensor to obtain biometric data of the document bearer, person or animal;
   an encoder to encode the biometric data to form a digital identification image comprising redundancies in a code;
   the detector to determine physical characteristics of cells of at least one shape, according to the printing conditions, such that a proportion of cells is printed with a random print error that is greater than a predefined first value and less than a predefined second value;
   an image encoder to form, in said at least one shape, an authentication image for the document, the authentication image comprising elementary cells whose content is representative of an encoded digital identification image; the image encoder is configured to perform a permutation of elementary cells by utilizing a hash function that utilizes a hashing key, and
   the printer prints the authentication image and the digital identification image on the document, implementing the printing conditions determined to generate random print errors in the printed elementary cells of the authentication image, a copy of said at least one shape being detected by modification of an appearance of the elementary cells.

2. Device according to claim 1, wherein the sensor is configured to obtain a photograph of a head of the person or animal; and wherein the biometric encoder is configured to encode the photograph to form the digital identification image.

3. Device according to claim 1, wherein the biometric encoder is configured to encode the biometric data into at least one hundred thousand elementary cells.

4. Device according to claim 1, wherein the biometric encoder is configured to apply a redundancy factor equal to at least three.

5. Device according to claim 1, wherein each of the biometric and image encoders is configured to form a readable image that can be printed at a resolution of 600 dots per inch.

6. Device according to claim 1, wherein the sensor is configured to obtain data representative of at least one fingerprint of the person; and wherein the biometric encoder is configured to encode the data representative of the fingerprint.

7. Device according to claim 1, further comprising a forming apparatus to form at least one surface for depositing a fingerprint on the document.

8. Device according to claim 1, wherein the image encoder is configured to form a printable image comprising at least one tenth of elementary cells representing erroneous content when printed.

9. Device according to claim 1, wherein the image encoder is configured to encode at least one item of identification information of the document bearer in the authentication image.

10. Device according to claim 1, wherein at least one of the biometric and image encoder is configured to perform a permutation of elementary cells representative of a fingerprint by utilizing a hash function that utilizes a hashing key.

11. Method for producing a document carrying a identification of a document bearer, person or animal, comprising:
    a step of determining physical printing conditions regarding a printer used to mark the document;

a step of obtaining with a sensor biometric data of the document bearer, person or animal;

a step of encoding the biometric data to form a digital identification image comprising redundancies in a code;

a step of determining physical characteristics of cells of at least one shape, according to the print conditions, such that a proportion of cells is printed with a random print error that is greater than a predefined first value and less than a predefined second value;

an encoding step for forming, in said at least one shape, an authentication image for the document; said authentication image comprising elementary cells whose content is representative of an encoded digital identification image; during the encoding step a permutation of elementary cells is performed by utilizing a hash function that utilizes a hashing key, and a step of printing the authentication image and the digital identification image on the document, implementing the printing conditions determined to generate random print errors in the printed elementary cells of the authentication image, a copy of said at least one shape detected by modification of an appearance of the elementary cells.

\* \* \* \* \*